United States Patent
Dueck et al.

(10) Patent No.: US 7,150,449 B1
(45) Date of Patent: Dec. 19, 2006

(54) OVERHEAD STORAGE SYSTEM

(75) Inventors: Raymond Dueck, Arborg (CA); Scott Brockie, Tavares, FL (US)

(73) Assignee: V-Bro Products LLC, Tavares, FL (US)

( * ) Notice: Subject to any disclaimer, the term of this patent is extended or adjusted under 35 U.S.C. 154(b) by 0 days.

(21) Appl. No.: 11/135,754

(22) Filed: May 23, 2005

(51) Int. Cl.
*B66D 1/26* (2006.01)

(52) U.S. Cl. .................. 254/278; 254/283; 254/380; 248/320; 248/329; 248/343; 414/626; 294/74

(58) Field of Classification Search ................ 254/278, 254/283, 334, 380; 248/320, 322, 323, 327, 248/329, 343; 414/626; 294/74
See application file for complete search history.

(56) References Cited

U.S. PATENT DOCUMENTS

| | | | | |
|---|---|---|---|---|
| 410,507 | A * | 9/1889 | Fain | 254/278 |
| 2,686,659 | A * | 8/1954 | Bittner | 254/283 |
| 3,809,422 | A * | 5/1974 | Schlough | 294/74 |
| D257,028 | S * | 9/1980 | Row | D34/33 |
| 4,892,203 | A * | 1/1990 | Arav | 212/331 |
| 4,927,537 | A * | 5/1990 | Meurer | 210/527 |
| 5,263,687 | A * | 11/1993 | Garbiso | 254/334 |
| 5,280,715 | A * | 1/1994 | Baldwin | 72/446 |
| 5,897,104 | A * | 4/1999 | Garbiso | 254/334 |
| 6,105,938 | A * | 8/2000 | Koida | 254/278 |
| 6,386,515 | B1 * | 5/2002 | Sachtleben | 254/338 |
| 6,957,804 | B1 * | 10/2005 | Heggestad | 254/278 |
| 6,969,049 | B1 * | 11/2005 | Bilcik | 254/278 |
| 6,991,064 | B1 * | 1/2006 | Ehrenleitner | 182/141 |
| 7,025,334 | B1 * | 4/2006 | Ehrenleitner | 254/278 |

FOREIGN PATENT DOCUMENTS

| | | | |
|---|---|---|---|
| JP | 11096831 A | * | 4/1999 |
| WO | WO8809159 | * | 12/1988 |

OTHER PUBLICATIONS

Bike Slingger—Bicycle Storage Systems, www.slingger.com Publication Date Unknown, 3 pages.

* cited by examiner

*Primary Examiner*—Emmanuel M Marcelo
(74) *Attorney, Agent, or Firm*—Michael S. Neustel (57) ABSTRACT

An overhead storage system for efficiently and conveniently stowing items such as bicycles at ceiling level. The overhead storage system includes a motor connected to a spool unit, a frame supporting the motor and attachable to a ceiling, an extended member extending from the frame, a pulley attached to a distal portion of the extended member, a first cable and a second cable attached to the spool unit with the second cable extending through the pulley, and a support member attached to the distal portions of the first cable and the second cable. The support member is comprised of an elongated structure capable of supporting one or more items such as but not limited to bicycles. A control unit controls the operation of the motor and is in communication with a controller operated by a user for raising and lowering the support member.

24 Claims, 7 Drawing Sheets

OVERHEAD STORAGE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to garage storage devices and more specifically it relates to an overhead storage system for efficiently and conveniently stowing items such as bicycles at ceiling level.

2. Description of the Related Art

Any discussion of the prior art throughout the specification should in no way be considered as an admission that such prior art is widely known or forms part of common general knowledge in the field.

Garage storage devices have been in use for years. One type of garage storage device is comprised of simple shelving that is supported by the floor in the garage or mounted directly to the wall where items can be placed upon the shelves. Another type of garage storage device are hooks with threaded ends that are threadably secured into the ceiling or walls of a garage whereby items such as bicycles can be attached to the hooks. One of the problems with conventional garage storage devices is that they are difficult to stow or remove larger awkward objects such as but not limited to bicycles. A further problem with conventional garage storage devices is that they require a significant amount of physical effort by a user to stow or remove an item. Another problem with conventional garage storage devices is that they typically either utilize a significant amount of space or do not efficiently utilize the ceiling space.

While conventional garage storage devices may be suitable for the particular purpose to which they address, they are not as suitable for efficiently and conveniently stowing items such as bicycles at ceiling level as shown in by the present invention. Conventional garage storage devices require a significant amount of physical effort to stow or remove an item, and also do not typically efficiently utilize ceiling storage space.

In these respects, the overhead storage system according to the present invention substantially departs from the conventional concepts and designs of the prior art, and in so doing provides an apparatus primarily developed for the purpose of efficiently and conveniently stowing items such as bicycles at ceiling level.

BRIEF SUMMARY OF THE INVENTION

In view of the foregoing disadvantages inherent in the known types of garage storage devices now present in the prior art, the present invention provides a new overhead storage system construction wherein the same can be utilized for efficiently and conveniently stowing items such as bicycles at ceiling level.

The general purpose of the present invention, which will be described subsequently in greater detail, is to provide a new overhead storage system that has many of the advantages of the garage storage devices mentioned heretofore and many novel features that result in a new overhead storage system which is not anticipated, rendered obvious, suggested, or even implied by any of the prior art garage storage devices, either alone or in any combination thereof.

To attain this, the present invention generally comprises a motor connected to a spool unit, a frame supporting the motor and attachable to a ceiling, an extended member extending from the frame, a pulley attached to a distal portion of the extended member, a first cable and a second cable attached to the spool unit with the second cable extending through the pulley, and a support member attached to the distal portions of the first cable and the second cable. The support member is comprised of an elongated structure capable of supporting one or more items such as but not limited to bicycles. A control unit controls the operation of the motor and is in communication with a controller operated by a user for raising and lowering the support member.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide an overhead storage system that will overcome the shortcomings of the prior art devices.

A second object is to provide an overhead storage system for efficiently and conveniently stowing items such as bicycles at ceiling level.

Another object is to provide an overhead storage system that can be utilized in various sizes of garages and various ceiling heights.

An additional object is to provide an overhead storage system that does not require significant physical effort to stow or retrieve an item.

A further object is to provide an overhead storage system that is capable of storing various items of various shapes, sizes and weights (e.g. bicycles, ladders, surfboards, golf clubs, kayaks, canoes, sawhorse, scooters, etc.).

Another object is to provide an overhead storage system that supports an item in an upright position thereby allowing for inspection and repairs without having to remove the item.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7 illustrate an overhead storage system 10, which comprises a motor 20 connected to a spool unit 50, a frame 40 supporting the motor 20 and attachable to a ceiling 12, an extended member 42 extending from the frame 40, a pulley 44 attached to a distal portion of the extended member 42, a first cable 56 and a second cable 58 attached to the spool unit 50 with the second cable 58 extending through the pulley 44, and a support member 60 attached to the distal portions of the first cable 56 and the second cable 58. The support member 60 is comprised of an elongated structure capable of supporting one or more items such as but not limited to bicycles 14. A control unit 70 controls the operation of the motor 20 and is in communication with a controller 72 operated by a user for raising and lowering the support member 60.

B. Quick Coupler Structure

As shown in FIGS. 1 through 5 of the drawings, a quick coupler structure 30 is attachable to a ceiling 12 utilizing various attachment systems. The quick coupler structure 30 is preferably comprised of a base 36 that is attachable to a ceiling 12 wherein the base 36 secures the frame 40 in a quick attach manner. The base 36 preferably includes a plurality of threaded shafts 34 that extend through a corresponding plurality of apertures within the base 36 for securing the frame 40 to the base 36 using fastener nuts or the like.

Figure 4:
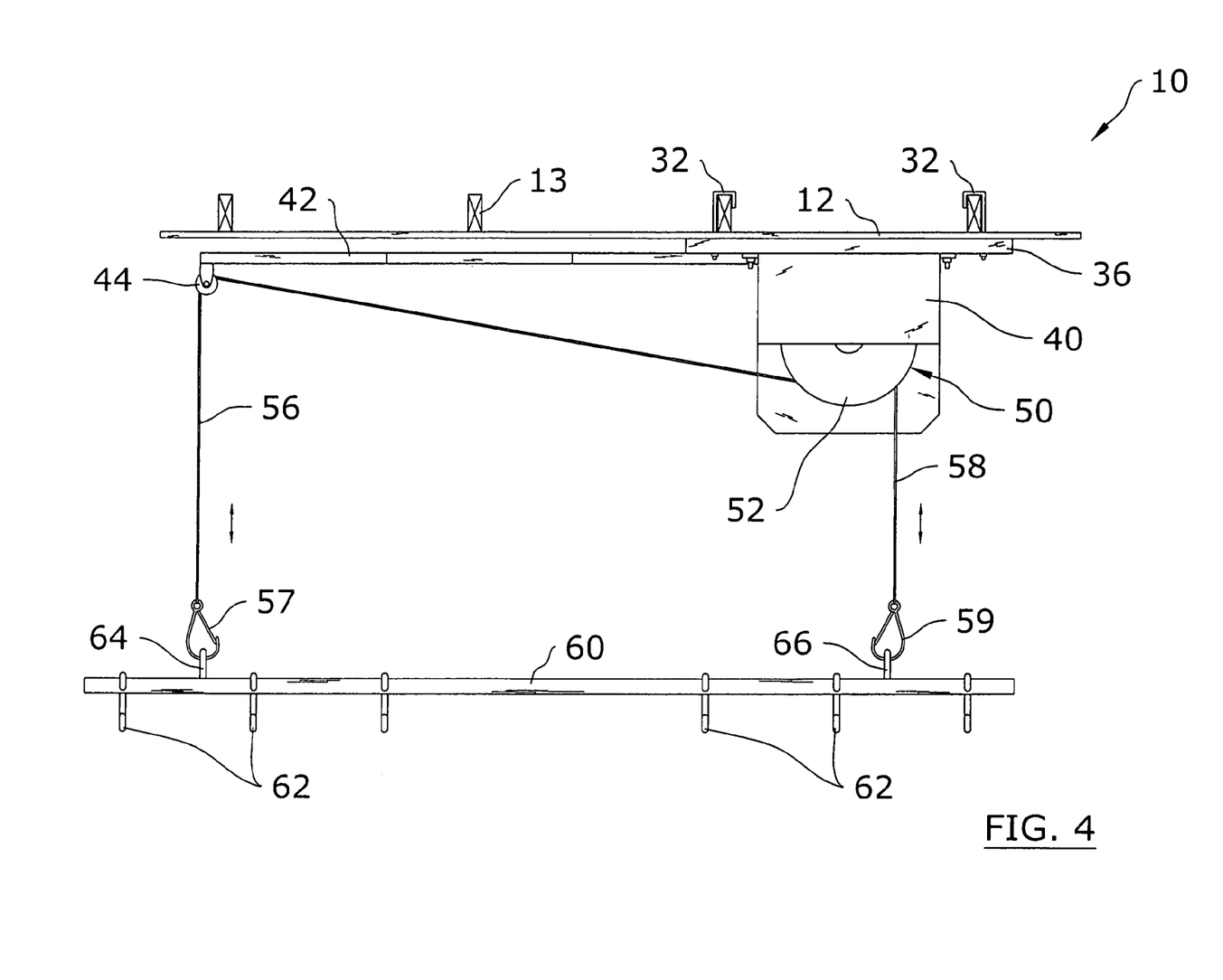
FIG. 4 is a side view of the present invention attached to a ceiling.
Figure 5:
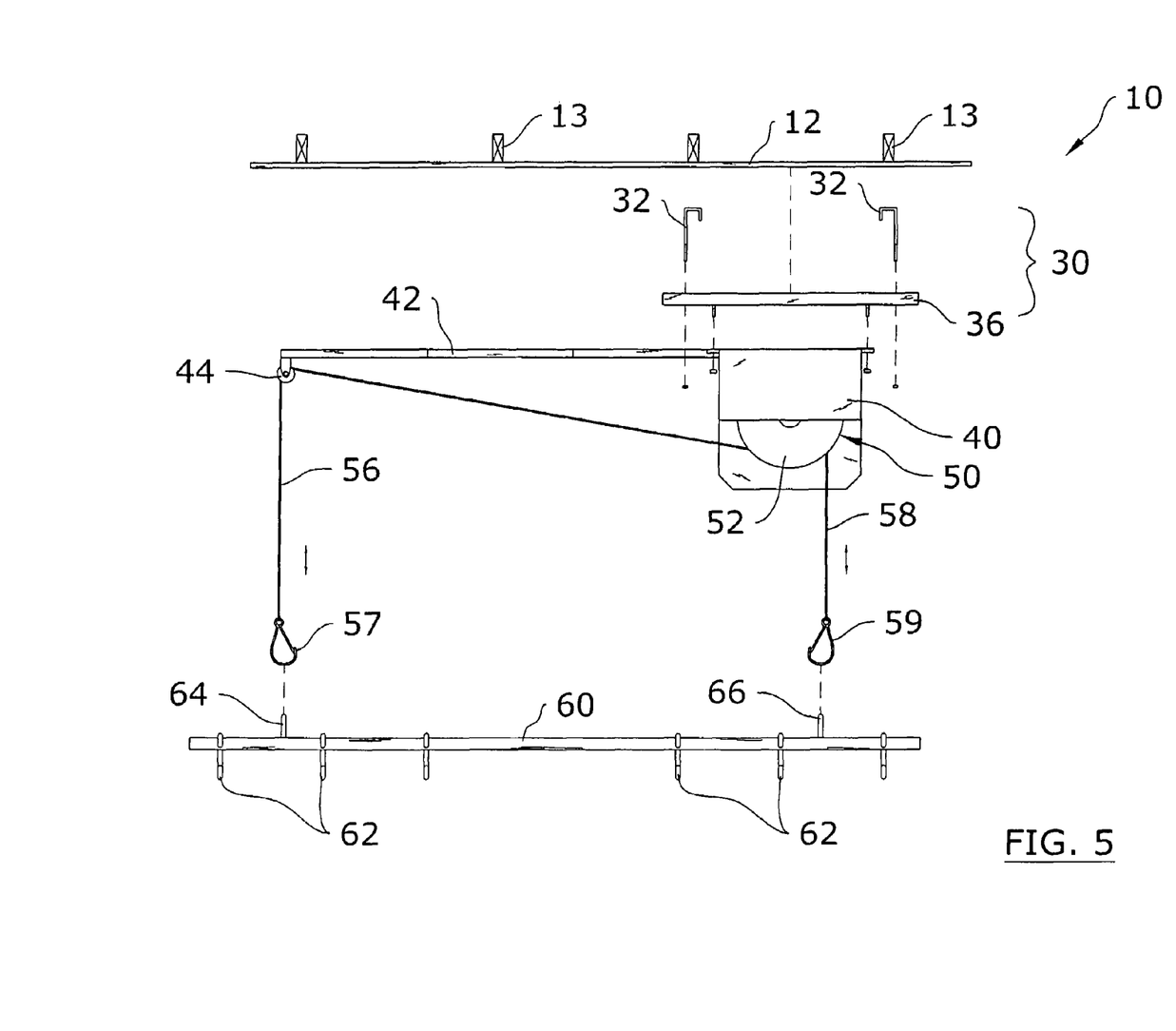
FIG. 5 is an exploded side view of the present invention with respect to a ceiling.

A plurality of J-hooks 32 are preferably utilized for securing the base 36 to the ceiling 12 as illustrated in FIGS. 4 and 5 of the drawings. The J-hooks 32 are connectable with a plurality of support beams 13 within the ceiling 12 and are connectable to the base 36 within openings within the base 36 for securing the base 36 to the ceiling 12.

C. Frame

The frame 40 is attachable to the quick coupler structure 30 utilizing various attachment systems. However, it can be appreciated that the frame 40 may be directly attached to the ceiling 12 without the quick coupler structure 30. The frame 40 may also be comprised of various types of structures capable of being attached to a ceiling 12 and providing the support necessary to operate the present invention.

As shown in FIGS. 1 through 5 of the drawings, an extended member 42 preferably extends from the frame 40 a finite distance. The extended member 42 preferably extends substantially transverse with respect to the first cable 56 and the second cable 58 (i.e. substantially horizontal to the ceiling 12) as shown in FIGS. 1 through 5 of the drawings. A pulley 44 is attached to the extended member 42 as shown in FIGS. 1 through 6 of the drawings. The second cable 58 (discussed below) extends about the pulley 44 and to the support member 60 as illustrated in FIGS. 1 through 4 of the drawings.

D. Motor

A motor 20 is attached to the frame 40 for rotating the spool unit 50 which thereby raises and lowers the support member 60. The motor 20 is preferably comprised of an electrical motor 20 capable of both forward and reverse rotation to cause selective lowering and raising of the support member 60. However, a transmission unit may be positioned between the motor 20 and the spool unit 50 for directing the rotation of the spool unit 50 as desired.

E. Spool Unit and Cables

The spool unit 50 is connected to the motor 20 and may be rotatably supported within the frame 40. The motor 20 drives the spool unit 50 in a lowering rotation and a raising rotation for selectively lowering and raising the support member 60. The spool unit 50 is preferably comprised of a first spool 52 and a second spool 54 that are positioned side-by-side as best illustrated in FIG. 6 of the drawings.

Figure 6:
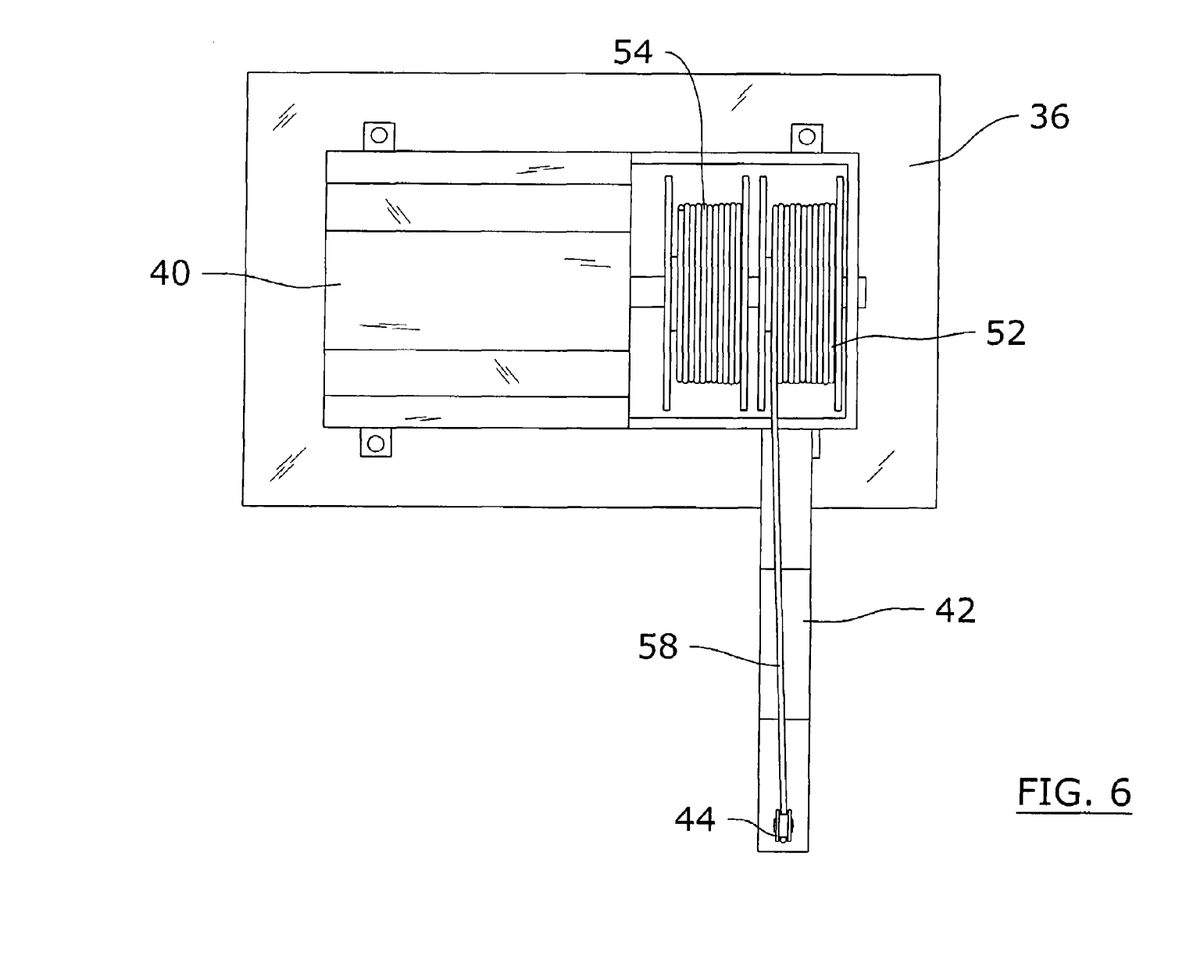
FIG. 6 is a bottom view of the present invention.

A length of first cable 56 attached to the first spool 52 of the spool unit 50 as illustrated in FIG. 6 of the drawings. In addition, a length of second cable 58 is attached to the second spool 54 of the spool unit 50 as further shown in FIG. 6 of the drawings. It can be appreciated that the first cable 56 and the second cable 58 may be comprised of a single or multiple segments of cable. It can also be appreciated that the term "cable" should not limit the types of materials or structures used for constructing the cables 56, 58 (e.g. metal, plastic, nylon, chains, etc.). The term "cable" is used broadly to merely describe an elongated flexible structure capable of supporting the support member 60 and any attached items. The cables 56, 58 may be constructed of various lengths capable of providing sufficient length for lowering the support member 60 from near the ceiling 12 to a floor. It is desirable that the cables 56, 58 are capable of supporting at least 300 pounds for extended periods of time.

When the spool unit 50 is in the lowering rotation, the first cable 56 and the second cable 58 are dispensed from the spool unit 50. When the spool unit 50 is in the raising rotation, the first cable 56 and the second cable 58 are drawn into the spool unit 50.

F. Support Member

The support member 60 attached to the distal portions of the first cable 56 and the second cable 58 as shown in FIGS. 1 through 5 of the drawings. The support member 60 is preferably comprised of an elongated structure capable of supporting one or more items (e.g. bicycle 14, bag 16, basket, canoe, etc.). The support member 60 may be comprised of a single tubular or shaft structure as shown in FIGS. 1 through 6 of the drawings, or the support member 60 may be comprised of various other types of structures capable of supporting one or more items. When the support member 60 is attached to the cables 56, 58, the support member 60 is preferably substantially level and horizontal with respect to a floor.

The first cable 56 and the second cable 58 preferably extend substantially vertically in an upwardly manner from the support member 60 as best illustrated in FIG. 4 of the drawings. The first cable 56 and the second cable 58 are preferably spaced apart at least two feet for providing additional stability for the support member 60 and to prevent rotation of the support member 60. It can be appreciated that the support member 60 is lowered when the spool unit 50 is in the lowering rotation and is raised when the spool unit 50 is in the raising rotation. It can be appreciated that more than two cables may be utilized within the present invention.

The support member 60 includes a plurality of support hooks 62 for attaching the items or support straps as shown in FIGS. 1 through 6 of the drawings. The items (e.g. bicycle 14, bag 16, etc.) may be attached to the support hooks 62 directly or via other attachment devices (e.g. straps, cables, chains, etc.). It can be appreciated that other structures may be utilized to attach the items to the support member 60.

A first member 64 and a second member 66 preferably extend from the support member 60 as shown in FIGS. 1 through 6 of the drawings. A first connector 57 and a second connector 59 are preferably connected to the first cable 56 and the second cable 58 respectively for removably attaching the cables 56, 58 to the support member 60 as also shown in FIGS. 1 through 6 of the drawings. The first connector 57 and the second connector 59 are removably connected to the first member 64 and the second member 66 respectively as shown in FIGS. 1 through 5 of the drawings. The first member 64 and the second member 66 preferably are comprised of an eyelet structure for removably receiving the first connector 57 and the second connector 59. The first connector 57 and the second connector 59 are preferably comprised of a quick release hook structure as illustrated in FIG. 4 of the drawings.

G. Control Unit

Figure 7:
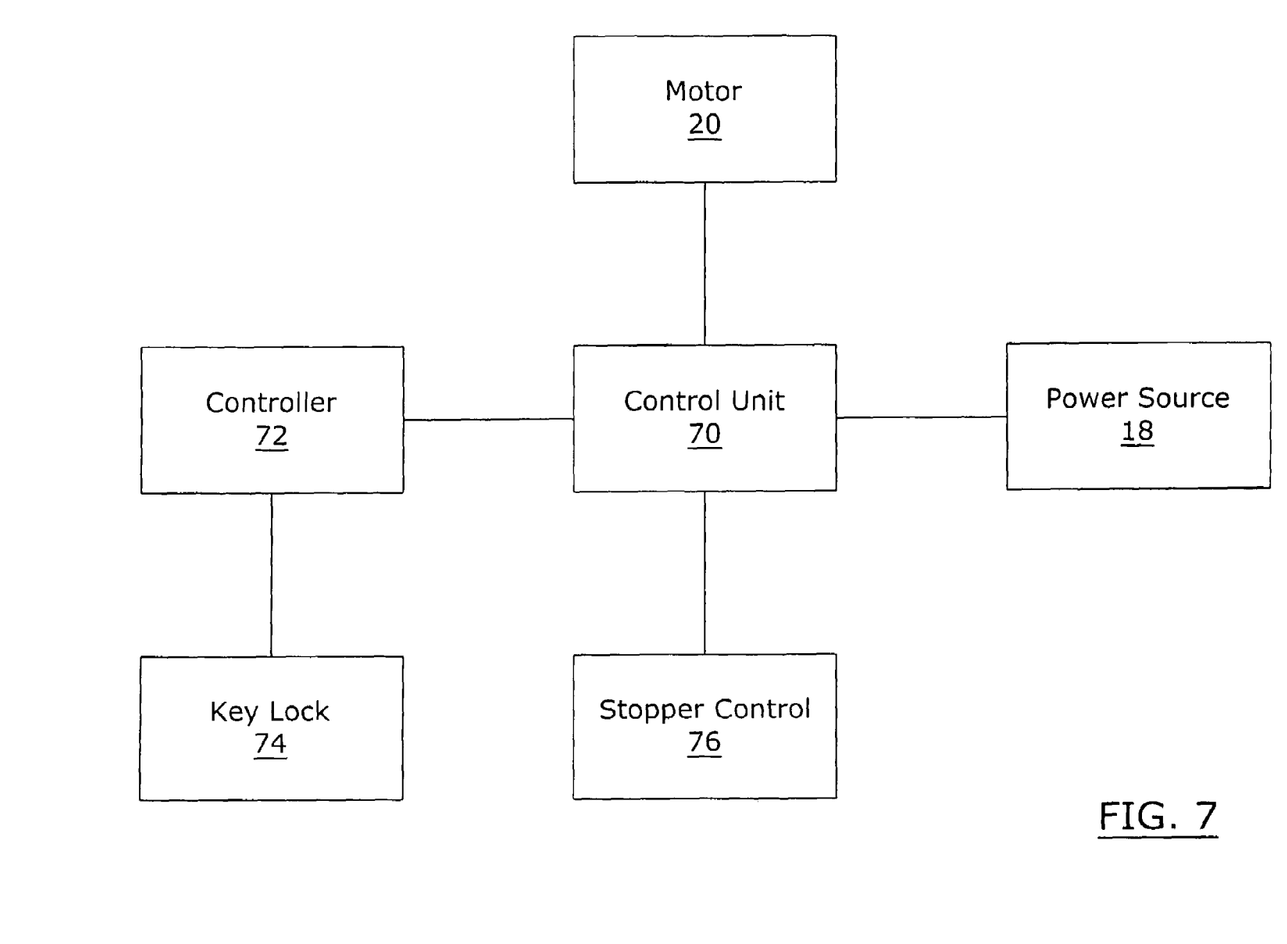
FIG. 7 is a block diagram illustrating the overall electrical devices of the present invention.

As shown in FIG. 7 of the drawings, a control unit 70 is in communication with the motor 20 for controlling the motor 20. The control unit 70 may be comprised of various electronic devices capable of controlling the rotation speed and rotation direction of the motor 20. The control unit 70 is preferably electrically connected to a power source 18 (e.g. existing AC power supply) as shown in FIG. 7 of the drawings. The motor 20 may be directly connected to the power source 18 or provided electrical power to via the control unit 70.

As further shown in FIG. 7, a controller 72 is in communication (e.g. electrically, remotely via radio waves, etc.) with the control unit 70 for allowing a user to control the operation of the motor 20 for lowering and raising the support member 60. The controller 72 may be attached to a wall in the building or may be comprised of a portable structure.

The controller 72 preferably includes a lock 74 for selectively preventing movement of the motor 20 as shown in FIG. 7. The lock 74 prevents movement of the motor 20 and thereby prevents lowering or raising of the support member 60 which is important for parental control and reducing theft.

H. Operation of Invention

In use, the user secures the base 36 to the ceiling 12 by attaching the J-hooks 32 to the support beams 13 in the ceiling 12 and then securing the J-hooks 32 to the base 36 as shown in FIGS. 4 and 5 of the drawings. The user then attaches the frame 40 to the base 36 as shown in FIG. 4 of the drawings.

Figure 1:
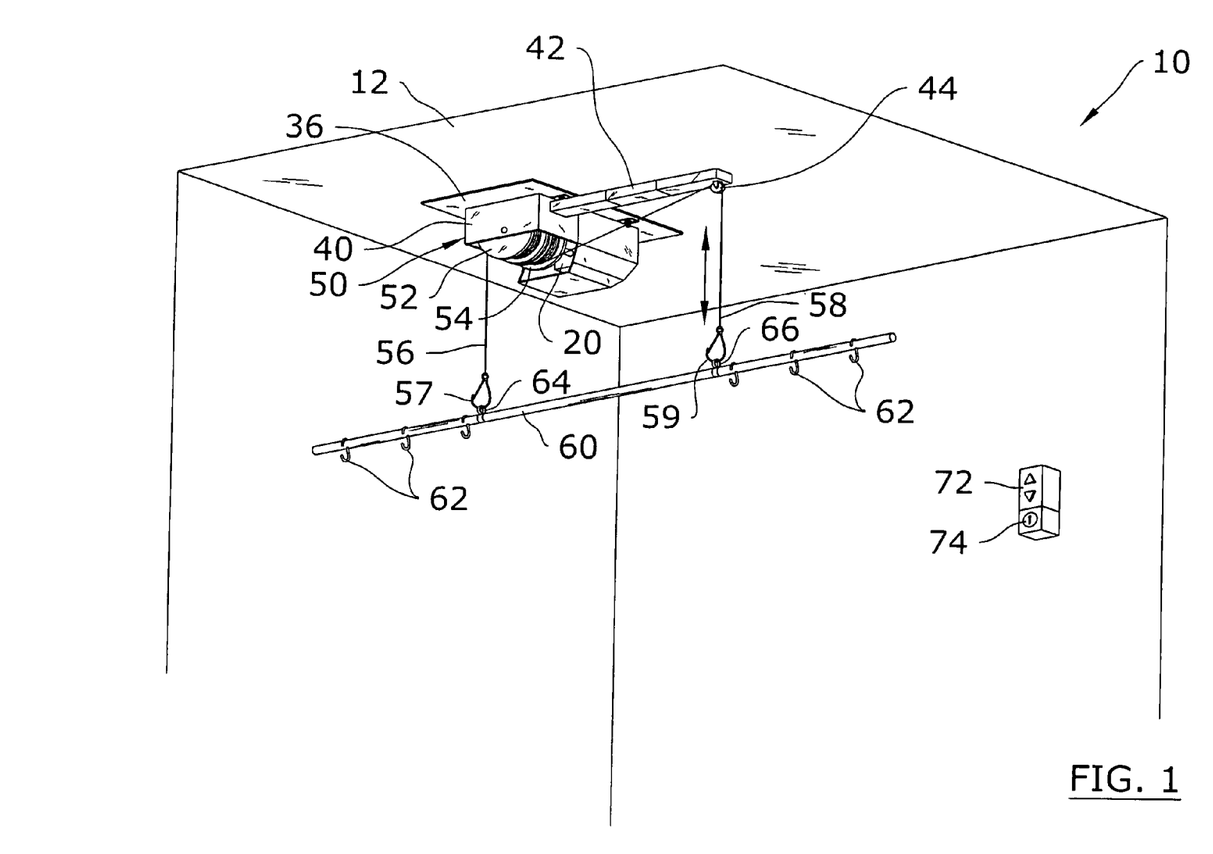
FIG. 1 is a lower perspective view of the present invention attached to a ceiling in the raised position.
Figure 2:
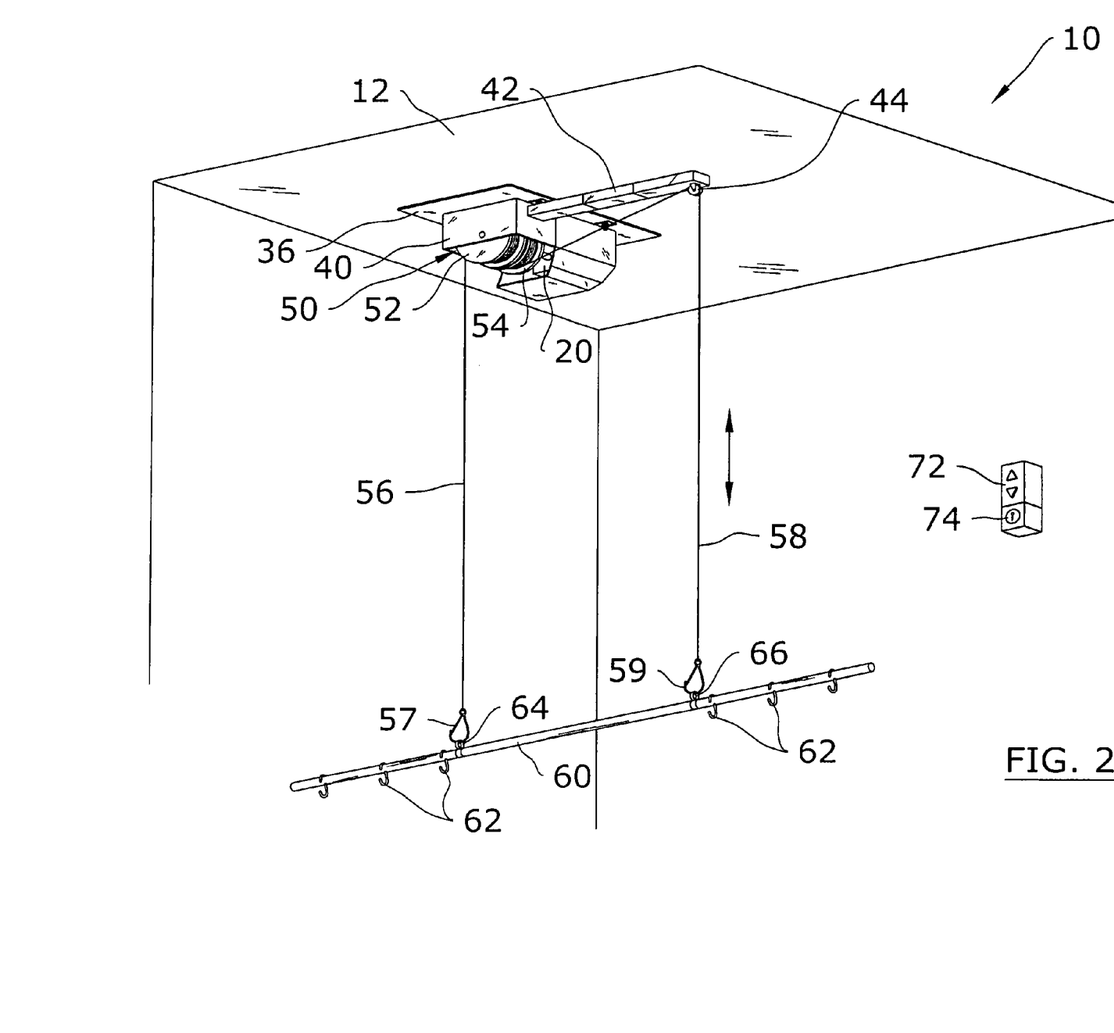
FIG. 2 is a lower perspective view of the present invention attached to a ceiling in the lowered position.
Figure 3:
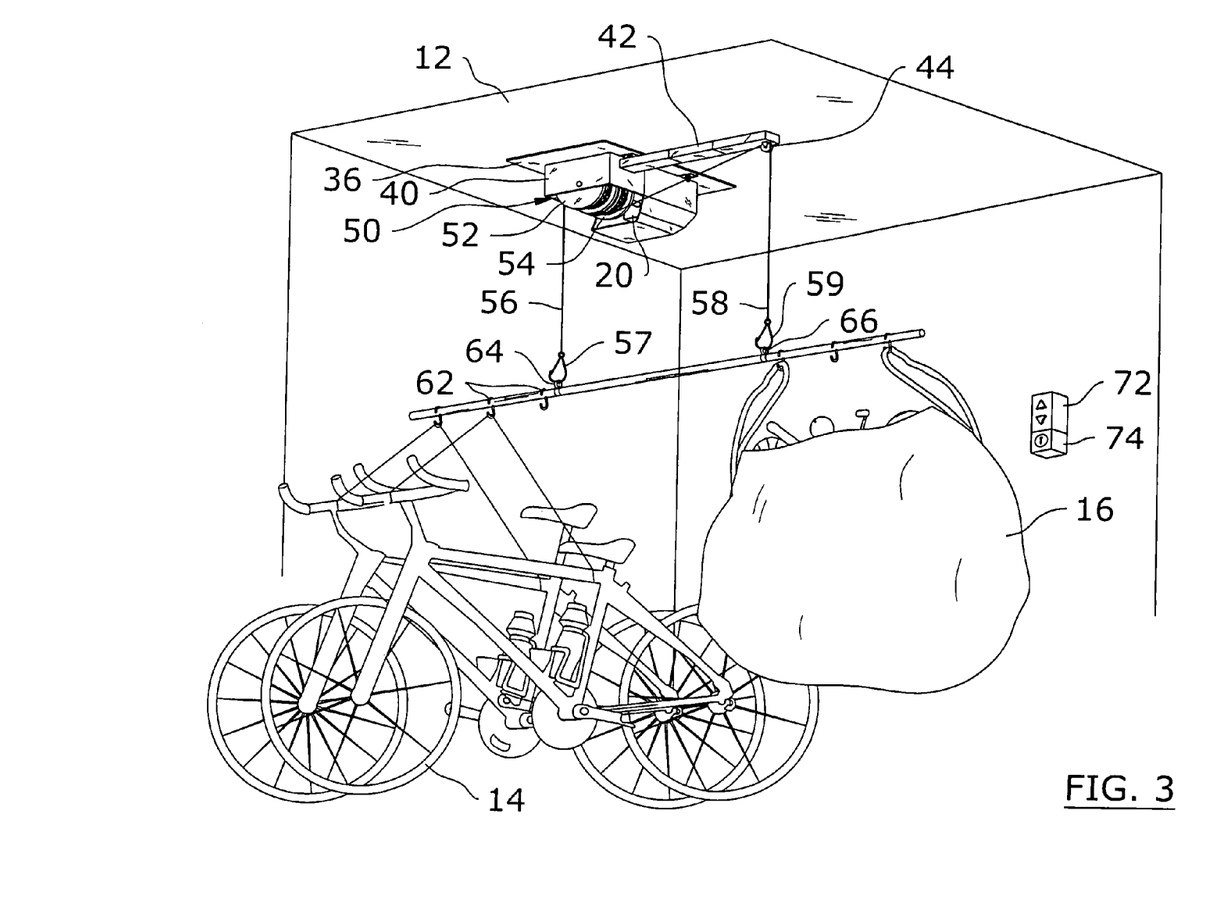
FIG. 3 is a lower perspective view of the present invention-attached to a ceiling in a substantially raised position supporting a plurality of items.

After the present invention is attached to the ceiling 12 as shown in FIGS. 1 through 4 of the drawings, the user then is able to control the operation of the present invention for stowing and retrieving items. For example, if the user intends to stow one or more items, the user manipulates the controller 72 to cause the motor 20 to rotate in the lowering rotating which causes the cables 56, 58 to lower the support member 60 until the support member 60 is lowered to a desired level with respect to the floor as shown in FIG. 2 of the drawings. The user is then able to attach the items (e.g. bicycle 14, bag 16, etc.) to the support member 60 as desired as shown in FIG. 3 of the drawings. Once the items are properly secured to the support member 60, the user then manipulates the controller 72 to cause the motor 20 to rotate in the raising rotation thereby causing the support member 60 to raise upwardly towards the ceiling 12. The user may stop the upward movement of the support member 60 at anytime or an automatic stopper control 76 (similar to garage door openers) may be utilized to automatically stop the motor 20 during its upward movement as shown in FIG. 3 of the drawings. The user may secure the items in the raised position by securing the lock 74 within the controller 72 thereby preventing movement of the motor 20.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. An overhead storage system, comprising:

a frame attachable to a ceiling;

a motor attached to said frame;

a spool unit connected to said motor and wherein said motor drives said spool unit in a lowering rotation and a raising rotation;

a length of first cable attached to said spool unit and a length of second cable attached to said spool unit, wherein when said spool unit is in said lowering rotation said first cable and said second cable are dispensed from said spool unit, and wherein when said spool unit is in said raising rotation said first cable and said second cable are drawn into said spool unit;

a support member attached to said first cable and said second cable, wherein said support member is capable of supporting one or more items, wherein said support member is lowered when said spool unit is in said lowering rotation, and wherein said support member is raised when said spool unit is in said raising rotation; and an extended member extending from said frame and a pulley attached to said extended member, wherein said second cable extends about said pulley.

2. The overhead storage system of claim 1, including a base that is attachable to the ceiling and wherein said frame attaches to said base.

3. The overhead storage system of claim 2, wherein said base includes a plurality of threaded shafts that are received within apertures within said frame for securing said frame to said base.

4. The overhead storage system of claim 2, including a plurality of J-hooks connectable with a plurality of support beams within the ceiling and connectable to said base for securing said base to said ceiling.

5. The overhead storage system of claim 4, wherein said plurality of J-hooks extend through a plurality of openings within said base.

6. The overhead storage system of claim 1, wherein said frame is attachable to a quick coupler structure, wherein said quick coupler structure is attachable to the ceiling.

7. The overhead storage system of claim 1, wherein said first cable and said second cable extend substantially vertically in an upwardly manner from said support member.

8. The overhead storage system of claim 7, wherein said first cable and said second cable are spaced apart at least two feet.

9. The overhead storage system of claim 7, wherein said extended member extends substantially transverse with respect to said first cable and said second cable.

10. The overhead storage system of claim 1, wherein said support member is comprised of an elongated structure.

11. The overhead storage system of claim 1, wherein said support member includes a plurality of support hooks for attaching the items or support straps.

12. The overhead storage system of claim 1, including a first member and a second member extending from said support member, and a first connector and a second connector connected to said first cable and said second cable respectively and removably connected to said first member and said second member respectively.

13. The overhead storage system of claim 12, wherein said first connector and said second connector are comprised of a hook structure.

14. The overhead storage system of claim 1, wherein said spool unit is comprised of a first spool and a second spool that receive said first cable and said second cable respectively.

15. The overhead storage system of claim 14, wherein said first spool and said second spool are side-by-side.

16. The overhead storage system of claim 1, including a control unit in communication with said motor for controlling said motor, and a controller in communication with said control unit for allowing a user to control the operation of said motor for lowering and raising the support member.

17. The overhead storage system of claim 16, wherein said controller includes a lock for selectively preventing movement of said motor.

18. An overhead storage system, comprising:
a quick coupler structure attachable to a ceiling;
a frame attachable to said quick coupler structure;
a motor attached to said frame;
a spool unit connected to said motor and wherein said motor drives said spool unit in a lowering rotation and a raising rotation, and wherein said spool unit is comprised of a first spool and a second spool that are positioned side-by-side;
a length of first cable attached to said first spool of said spool unit and a length of second cable attached to said second spool of said spool unit, wherein when said spool unit is in said lowering rotation said first cable and said second cable are dispensed from said spool unit, and wherein when said spool unit is in said raising rotation said first cable and said second cable are drawn into said spool unit;
an extended member extending from said frame, wherein said extended member extends substantially transverse with respect to said first cable and said second cable;
a pulley attached to said extended member, wherein said second cable extends about said pulley;
a support member attached to said first cable and said second cable, wherein said support member is comprised of an elongated structure capable of supporting one or more items, wherein said support member is lowered when said spool unit is in said lowering rotation, wherein said support member is raised when said spool unit is in said raising rotation, wherein said first cable and said second cable extend substantially vertically in an upwardly manner from said support member, wherein said first cable and said second cable are spaced apart at least two feet, and wherein said support member includes a plurality of support hooks for attaching the items or support straps;
a first member and a second member extending from said support member, and a first connector and a second connector connected to said first cable and said second cable respectively and removably connected to said first member and said second member respectively, wherein said first connector and said second connector are comprised of a hook structure; and
a control unit in communication with said motor for controlling said motor, and a controller in communication with said control unit for allowing a user to control the operation of said motor for lowering and raising the support member, wherein said controller includes a lock for selectively preventing movement of said motor.

19. The overhead storage system of claim 18, wherein said quick coupler structure is comprised of:
a base that is attachable to a ceiling, wherein said base includes a plurality of threaded shafts, wherein said frame includes a plurality of apertures that correspond to and receive said plurality of threaded shafts for securing said frame to said base; and
a plurality of J-hooks connectable with a plurality of support beams within the ceiling and connectable to said base within openings within said base for securing said base to said ceiling.

20. An overhead storage system, comprising:
a frame attachable to a ceiling;
a motor attached to said frame;
a spool unit connected to said motor and wherein said motor drives said spool unit in a lowering rotation and a raising rotation;
a length of first cable attached to said spool unit and a length of second cable attached to said spool unit, wherein when said spool unit is in said lowering rotation said first cable and said second cable are dispensed from said spool unit, and wherein when said spool unit is in said raising rotation said first cable and said second cable are drawn into said spool unit;
a support member attached to said first cable and said second cable, wherein said support member is capable of supporting one or more items, wherein said support member is lowered when said spool unit is in said lowering rotation, and wherein said support member is raised when said spool unit is in said raising rotation; and a first member and a second member extending from said support member, and a first connector and a second connector connected to said first cable and said second cable respectively and removably connected to said first member and said second member respectively.

21. The overhead storage system of claim 20, wherein said first connector and said second connector are comprised of a hook structure.

22. An overhead storage system, comprising:
- a frame attachable to a ceiling;
- a motor attached to said frame;
- a spool unit connected to said motor and wherein said motor drives said spool unit in a lowering rotation and a raising rotation;
- a length of first cable attached to said spool unit and a length of second cable attached to said spool unit, wherein when said spool unit is in said lowering rotation said first cable and said second cable are dispensed from said spool unit, and wherein when said spool unit is in said raising rotation said first cable and said second cable are drawn into said spool unit; and
- a support member attached to said first cable and said second cable, wherein said support member is capable of supporting one or more items, wherein said support member is lowered when said spool unit is in said lowering rotation, and wherein said support member is raised when said spool unit is in said raising rotation;

wherein said spool unit is comprised of a first spool and a second spool that receive said first cable and said second cable respectively.

23. The overhead storage system of claim 22, wherein said first spool and said second spool are side-by-side.

24. An overhead storage system, comprising:
- a frame attachable to a ceiling;
- a motor attached to said frame;
- a spool unit connected to said motor and wherein said motor drives said spool unit in a lowering rotation and a raising rotation;
- a length of first cable attached to said spool unit and a length of second cable attached to said spool unit, wherein when said spool unit is in said lowering rotation said first cable and said second cable are dispensed from said spool unit, and wherein when said spool unit is in said raising rotation said first cable and said second cable are drawn into said spool unit;
- a support member attached to said first cable and said second cable, wherein said support member is capable of supporting one or more items, wherein said support member is lowered when said spool unit is in said lowering rotation, and wherein said support member is raised when said spool unit is in said raising rotation;
- a base that is attachable to the ceiling and wherein said frame attaches to said base; and
- a plurality of J-hooks connectable with a plurality of support beams within the ceiling and connectable to said base for securing said base to said ceiling.

\* \* \* \* \*